United States Patent [19]
Groll et al.

[11] Patent Number: 5,722,648
[45] Date of Patent: Mar. 3, 1998

[54] SPRING LOADED LOCATOR PIN ASSEMBLY

[75] Inventors: Todd A. Groll, Idaho Falls; James P. White, Pocatelo, both of Id.

[73] Assignee: The United States of America as represented by the United States Department of Energy, Washington, D.C.

[21] Appl. No.: 662,174

[22] Filed: Jun. 12, 1996

[51] Int. Cl.$^6$ .................................................. B23Q 3/10
[52] U.S. Cl. ................................................... 269/47
[58] Field of Search ......................... 269/309, 310, 269/47, 48.1, 50, 52, 20, 303, 900, 903; 29/281.5

[56] References Cited

U.S. PATENT DOCUMENTS

| | | | |
|---|---|---|---|
| 3,918,694 | 11/1975 | Laudick | 269/47 |
| 4,500,079 | 2/1985 | Morghen | 269/309 |
| 4,629,384 | 12/1986 | Beshke et al. | 269/309 |
| 4,664,366 | 5/1987 | Lane et al. | 269/900 |
| 4,801,225 | 1/1989 | Morghen | 269/47 |

*Primary Examiner*—Robert C. Watson
*Attorney, Agent, or Firm*—John T. Lucas; William R. Moser; Paul A. Gottlieb

[57] ABSTRACT

This invention deals with spring loaded locator pins. Locator pins are sometimes referred to as captured pins. This is a mechanism which locks two items together with the pin that is spring loaded so that it drops into a locator hole on the work piece.

16 Claims, 2 Drawing Sheets

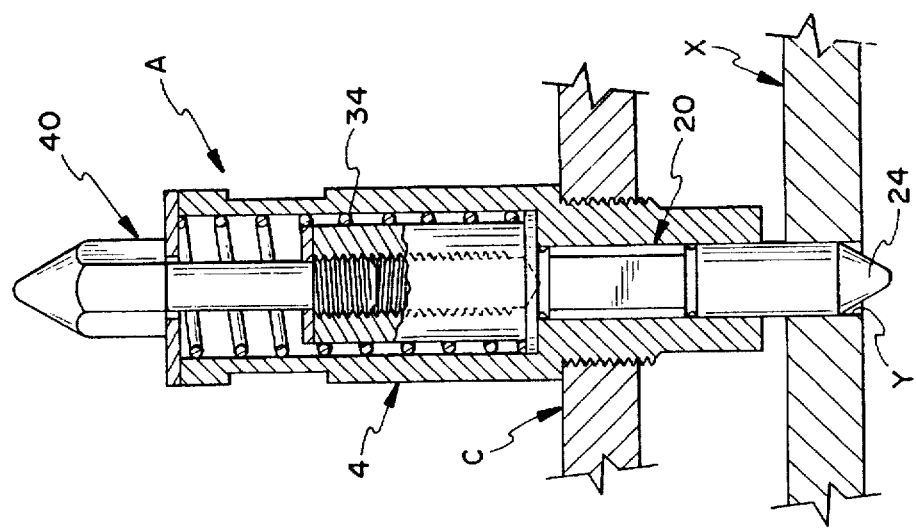
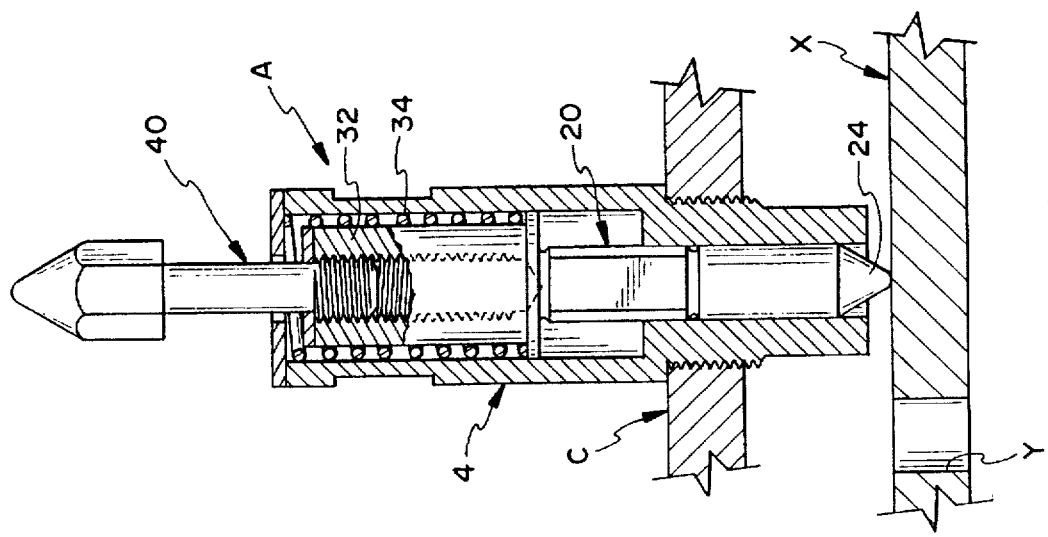
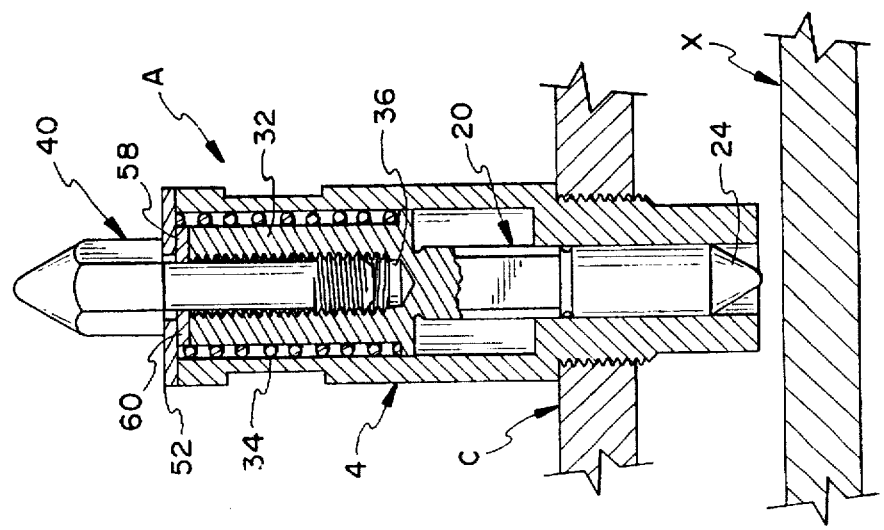

5,722,648

SPRING LOADED LOCATOR PIN ASSEMBLY

The invention relates to locator pins sometimes referred to as captured pins which position positively two items with respect to each other and lock them in position for machining or other work. The pin is suitable for use in a remote or hazardous environment where hands-on access is prohibited.

HISTORICAL BACKGROUND

Pins are frequently used to locate electrical parts, motors, components, etc. in a remote environment or the like. A difficulty with pins is that they are easily dropped to the floor or lost. Captured locator pins have been developed to eliminate this problem, but presently, the devices for manipulating these types of pins requires two remote manipulating devices which must be simultaneously operated. One is needed to align the mating part over the locating hole and the other is used to engage the pin. Obviously, difficulties arise from the need to have two manipulating devices.

OBJECTS AND SUMMARY

It is an object of this invention to provide a locator pin which is spring loaded so that only one tool is required for its operation.

Still a further object of this invention is to avoid parts which will become lost and separated during operation.

Another object of this invention is to provide a pin mechanism which is enclosed in a housing which captures the pin preventing it from being separated from the housing during operation.

Yet another object of this invention is to provide a locator pin which can be engaged remotely by use of a remote operated impact wrench.

A further object of this invention is to provide a locator pin which can be easily manufactured with a minimum number of parts at low cost.

Yet further object of this invention is to provide a locator pin which is durable and will stand up under thousands of operations without malfunctioning.

In summary, the spring loaded captured pin or locator pin is designed to automatically position two items with respect to each other when the pin engages a receptor hole thus positively positioning parts with respect to each other. These and other objects of the invention will be apparent from the following drawings:

DESCRIPTION OF DRAWINGS

FIG. 3 is a fragmentary cross sectional view of the locator pin assembly and tool support carriage and work receiving platform showing the locator pin in retracted position above the work.

FIG. 4 is a fragmentary view of the locator pin assembly on the tool support carriage mounted above the work and engaging the surface of the work prior to positioning the pin in the locator pin receptor or hole.

FIG. 5 is a fragmentary cross sectional view of the locator pin assembly mounted on the tool support carriage above the work with the pin engaged in the receptor opening of the work.

FIGS. 1 THROUGH 5

Positioned on the tool support carriage C is a drive wrench W. The drive wrench W is connected to the carriage C by conventional means (not shown).

The tool support carriage C moves on guide rails 2 for movement of the carriage C on the work receiving platform P.

Figure 2:
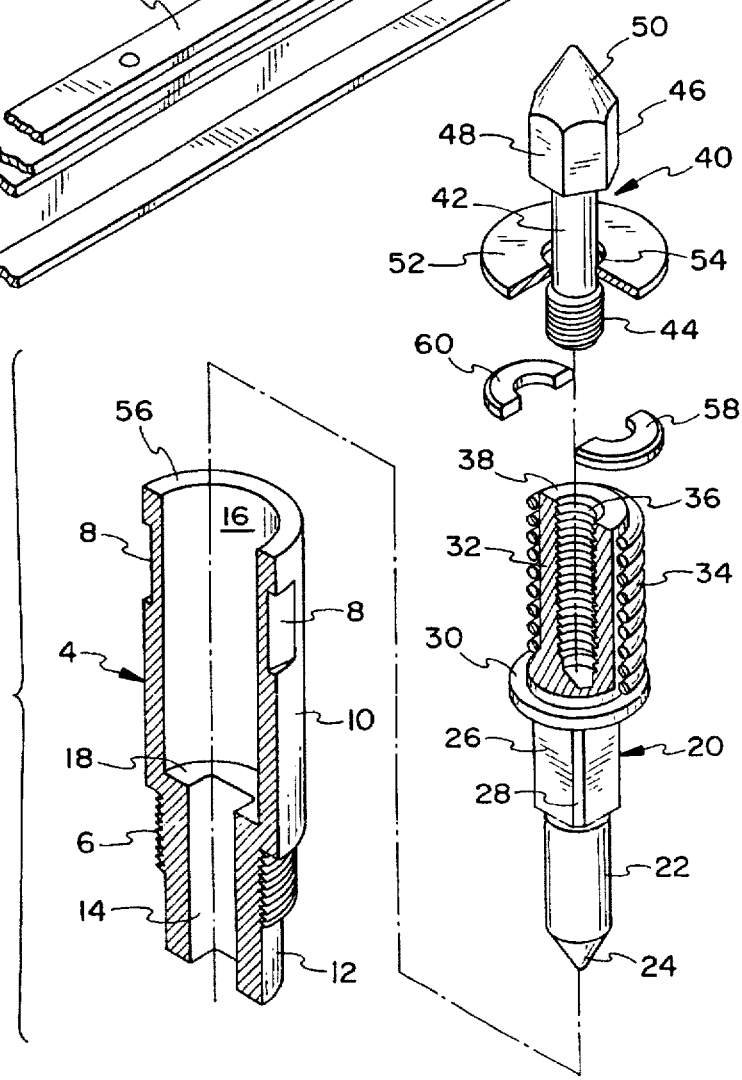
FIG. 2 is an exploded view of the locator pin assembly with portions broken away and shown in cross section.

In FIG. 2 the housing 4 is provided with external threads 6 which engage cooperating threads (not shown) in the tool support carriage C for positively positioning the locator pin assembly A on the tool support carriage C. The upper portion of the housing 4 includes wrench flats 8 for permitting a wrench to be used to thread the housing 4 into the tool support carriage C. The housing 4 is tubular shaped and includes an upper sleeve 10 having a uniform inside diameter. The lower sleeve 12 has a box passageway 14 which opens into the upper sleeve cylindrical passageway 16. The bottom 18 of the passageway 16 separates the passageway 14 from the passageway 16. The passageway 14 is of rectangular configuration but may be of other configurations designed to prevent rotation of the pin 20 in the housing 4. The pin 20 includes a shank 22 having a conical head 24. Above the shank 22 is an anti-rotational shank 26 having a boxlike configuration corresponding to the box passageway 14 in which it is received. The anti-rotational shank 26 includes flats 28 at each of the corners of the box configuration of the anti-rotational shank 26 for ease in positioning of the anti-rotational shank 26 in the box passageway 14.

Above the anti-rotational shank 26 is a flange 30 which engages the bottom of the passageway 18. A threaded shank 32 extends upwardly from the flange 30 as a cylindrical outside configuration for support of a coil spring 34.

A threaded bore 36 extends from the top 38 of the threaded shank 32 downwardly to approximately the plane of the flange 30 intersecting the threaded shank 32.

A screw assembly 40 includes a screw shank 42 having a threaded end 44 and a drive head 46. The drive head 46 is of a hex configuration with flats 48 forming the hex. The top of the head 46 is a cone 50 for ready homing into the drive wrench W which has a corresponding hex drive configuration (not shown). Surrounding the shank 42 is a retaining washer 52. The washer 52 includes an opening 54 which is sufficiently wide to receive the shank 42 with the threaded end 44 without engaging the threads 44. The retaining washer 52 is welded to the top 56 of the housing 4 for retaining the spring 34 in the cylindrical passageway 16.

Split retaining pieces 58 and 60 are welded to the top 38 of the threaded shank 32 and prevent escape of the threaded end 44 on the shank 42.

OPERATION

Figure 1:
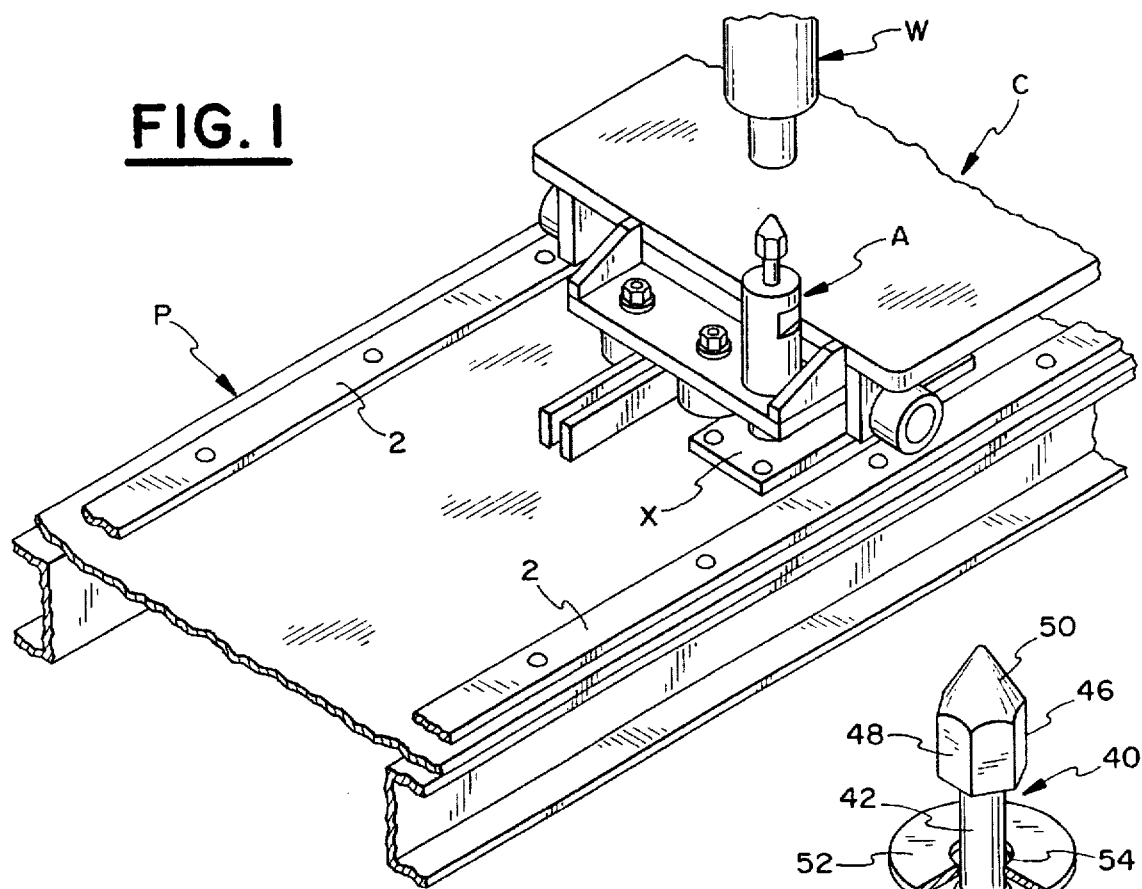
FIG. 1 is a fragmentary perspective of the tool support carriage C mounted on a work receiving platform P. The tool support carriage C includes the locator pin assembly A.

Referring now to FIGS. 3, 4 and 5, the operation is as follows. In FIG. 3, the locator pin assembly A is mounted in the tool support carriage C. The work X is positioned on the work receiving platform P as best shown in FIG. 1. The work piece X includes an opening Y for receiving the pin conical head 24. In FIG. 3, the screw assembly 40 is threaded as far as it will go into the threaded bore 36. This retracts the pin assembly 20 into the housing 4 to permit the work piece X to be positioned under the locator pin assembly A. The retraction of the screw assembly 40 is done by the drive wrench W.

Referring now to FIG. 4, the drive wrench W is now rotated in the reverse direction so that the screw assembly 40 is moved to the top of the threaded shank 32 which permits the spring 34 to extend the conical head of the pin 20 so that it engages the top surface of the work X. This spring 34 is under maximum compression in FIG. 3 and is in a first position in FIG. 4 prior to the pin's engaging in the opening Y as illustrated in FIG. 5. As soon as the opening Y in the work piece X is engaged by the conical head 24 of the pin 20, it will drop into the opening Y to position the work piece positively for subsequent machining or the like.

It will now be obvious that the only tool required for positioning of the pin 20 relative to the opening Y in the work piece X is the single drive wrench W which initially will be driven in one direction to compress the spring 34 and in the reverse direction to permit the spring 34 to drive the conical head of the pin 20 into the opening Y of the work piece X.

While this invention has been described as having a preferred design, it is understood that is capable of further modifications, uses and/or adaptations of the invention following in general the principle of the invention and including such departures from the present disclosure as come within the known or customary practice in the art to which to invention pertains and as may be applied to the central features hereinbefore set forth, and fall within the scope of the invention and of the limits of the appended claims.

We claim:

1. A spring loaded locator pin assembly for a tool support carriage including a locator pin for positively positioning work pieces, each work piece having a locator pin engager for aligning said work pieces on a work support including:
    a) said locator pin assembly having a housing,
    b) said housing having means for fixedly securing said locator pin assembly to said tool support carriage,
    c) said locator pin movable in said housing from a retracted position to first and second extended positions,
    d) said locator pin including spring positioning means,
    e) said housing including spring compression means,
    f) spring means having first and second ends,
    g) said first end engaging said spring positioning means,
    h) said second end engaging said spring compression means,
    i) a locator pin actuator cooperating with said locator pin for moving said locator pin relative to said housing from said retracted position to said first and second extended positions,
    j) whereby when said locator pin actuator is moved in one direction relative to said locator pin, it compresses said spring means and retracts said locator pin relative to said housing, and when said locator pin actuator is moved in the opposite direction relative to said locator pin, it decompresses said spring means and extends said locator pin relative to said housing so as to engage the surface of a work piece, and upon movement of said work piece or said tool support carriage, it further extends said locator pin when said locator pin engages said locator pin engager on said work piece; thereby positively positioning said work piece relative to said work support.

2. A spring loaded locator pin assembly as in claim 1 and wherein:
    a) said housing is generally tubular in shaped and said locator pin and said locator pin actuator are received in said housing.

3. A spring loaded locator pin assembly as in claim 2 and wherein:
    a) said housing includes anti-rotational means for said locator pin.

4. A spring loaded locator pin assembly as in claim 3 and wherein:
    a) said housing includes wrench applying means.

5. A spring loaded locator pin assembly as in claim 3 and wherein:
    a) said housing includes stop means for said locator pin.

6. A spring loaded locator pin assembly as in claim 3 and wherein:
    a) said anti-rotational means for said locator pin includes at least one flat surface, and
    b) said locator pin includes a flat surface cooperating with said at least one flat surface.

7. A spring loaded locator pin assembly as in claim 1 and wherein:
    a) said locator pin spring positioning means is a flange.

8. A spring loaded locator pin assembly as in claim 7 and wherein:
    a) said spring means is a coil encircling said locator pin.

9. A spring loaded locator pin assembly as in claim 8 and wherein:
    a) said locator pin includes a threaded socket, and
    b) said locator pin actuator having cooperating threads with said threaded socket and is received in said threaded socket.

10. A spring loaded locator pin assembly as in claim 1 and wherein:
    a) said spring compression means includes a retainer secured to said housing.

11. A spring loaded locator pin assembly as in claim 10 and wherein:
    a) said spring compression means retainer fits around said locator pin actuator, and
    b) said locator pin actuator moves relative to said spring compression means.

12. A spring loaded locator pin assembly as in claim 11 and wherein:
    a) said locator pin actuator includes a threaded shank and a tool engaging head.

13. A spring loaded locator pin assembly as in claim 12 and wherein:
    a) said locator pin includes means secured to said locator pin and in proximity to said locator pin actuator to prevent removal of said locator pin actuator from said locator pin when positioned in said housing.

14. A spring loaded locator pin assembly as in claim 13 and wherein:
    a) said means secured to said locator pin includes an opening for slidably receiving said locator pin actuator and of a diameter less then the threads of said shank.

15. A spring loaded locator pin assembly as in claim 14 and wherein:
    a) said spring means is a coil maintained between said housing and said locator pin.

16. A spring loaded locator pin assembly as in claim 15 and wherein:
    a) said tool engaging head includes a conical top.

* * * * *